United States Patent
Ambeskar et al.

(10) Patent No.: US 12,457,034 B2
(45) Date of Patent: Oct. 28, 2025

(54) ENHANCED CLOCK FREQUENCY CONTROL

(71) Applicant: Hughes Network Systems, LLC, Germantown, MD (US)

(72) Inventors: Nimesh Ambeskar, Germantown, MD (US); Patrick O'Neil, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 272 days.

(21) Appl. No.: 18/141,115

(22) Filed: Apr. 28, 2023

(65) Prior Publication Data

US 2024/0364417 A1    Oct. 31, 2024

(51) Int. Cl.
*H04B 7/185*    (2006.01)
*H04J 3/06*    (2006.01)
*H04W 56/00*    (2009.01)

(52) U.S. Cl.
CPC ........ *H04B 7/18519* (2013.01); *H04J 3/0667* (2013.01); *H04W 56/0015* (2013.01)

(58) Field of Classification Search
CPC .............. H04B 7/18519; H04J 3/0667; H04W 56/0015
See application file for complete search history.

(56) References Cited

U.S. PATENT DOCUMENTS

| | | | |
|---|---|---|---|
| 8,599,986 B2 * | 12/2013 | Rahbar | H03L 7/085 375/376 |
| 8,873,589 B2 | 10/2014 | Aweya et al. | |
| 8,913,632 B2 | 12/2014 | Aweya et al. | |
| 8,977,191 B2 | 3/2015 | Jong et al. | |
| 9,036,084 B2 | 5/2015 | Law et al. | |
| 9,112,631 B2 * | 8/2015 | Aweya | H04J 3/0664 |
| 9,172,458 B2 | 10/2015 | Ragland et al. | |
| 9,444,470 B2 * | 9/2016 | Milijevic | H03L 7/22 |
| 9,544,079 B2 | 1/2017 | Dalvi et al. | |

(Continued)

FOREIGN PATENT DOCUMENTS

WO    WO 2024/035980    2/2024

OTHER PUBLICATIONS

Bass, "How Precision Time Protocol (PTP) is Improving Accuracy One Clock at a Time," Global Knowledge, Apr. 2017, 3 pages.

(Continued)

*Primary Examiner* — Bailor C Hsu
(74) *Attorney, Agent, or Firm* — Kilpatrick Townsend & Stockton LLP (57) ABSTRACT

Methods, systems, and apparatus, for enhanced clock frequency control. In some implementations, a clock system tracks time using a clock signal having a clock frequency. An interface receives a time reference from a reference clock, and a feedback loop synchronizes the clock system with the reference clock. The feedback loop includes a feedback loop controller configured to determine a clock frequency adjustment for the clock system based on an offset between the time reference and a time indicated by the clock system. The feedback loop also includes a smoothing filter configured to alter the clock frequency adjustment determined using the feedback loop controller. The feedback loop updates the clock frequency of the clock system based on the altered clock frequency adjustment.

20 Claims, 4 Drawing Sheets

(56) References Cited

U.S. PATENT DOCUMENTS

| | | | |
|---|---|---|---|
| 9,591,595 | B2 | 3/2017 | Steber et al. |
| 9,628,210 | B1 | 4/2017 | Zampetti |
| 9,667,370 | B2 | 5/2017 | Tzeng et al. |
| 9,671,761 | B2 | 6/2017 | Dougan et al. |
| 9,749,035 | B2 | 8/2017 | Vasavada et al. |
| 9,843,405 | B2 | 12/2017 | Aweya et al. |
| 10,341,083 | B2 | 7/2019 | Mayer et al. |
| 10,361,772 | B2 * | 7/2019 | Regunathan ....... H04B 7/18513 |
| 10,476,509 | B2 * | 11/2019 | Spijker ................... H03L 7/093 |
| 10,483,987 | B1 * | 11/2019 | Ranganathan ........ H03L 7/1972 |
| 10,718,870 | B2 * | 7/2020 | Derbez .................... G01S 19/23 |
| 11,006,378 | B2 | 5/2021 | Koelemeij et al. |
| 11,038,511 | B2 * | 6/2021 | Weeks .................. H03L 7/0805 |
| 11,165,622 | B2 | 11/2021 | Ambeskar et al. |
| 11,323,195 | B2 | 5/2022 | Ambeskar et al. |
| 11,436,172 | B2 | 9/2022 | Hantz et al. |
| 11,496,234 | B2 | 11/2022 | Seethamraju |
| 11,616,587 | B1 | 3/2023 | Byagowi et al. |
| 2004/0234018 | A1 | 11/2004 | Ram et al. |
| 2013/0034197 | A1 | 2/2013 | Aweya et al. |
| 2015/0215031 | A1 | 7/2015 | Dalvi et al. |
| 2021/0203412 | A1 | 7/2021 | Whitefield et al. |
| 2023/0029644 | A1 | 2/2023 | Ambeskar et al. |
| 2023/0370984 | A1 | 11/2023 | Ambeskar et al. |
| 2024/0056178 | A1 | 2/2024 | Ambeskar et al. |

OTHER PUBLICATIONS

Endruntechnologies.com [online], "Precision Time Protocol (PTP/IEEE-1588)," available on or before May 14, 2015, via Internet Archive: Wayback Machine URL <https://web.archive.org/web/20150514095618/https://endruntechnologies.com/pdf/PTP-1588.pdf>, retrieved on Feb. 29, 2024, URL <https://endruntechnologies.com/pdf/PTP-1588.pdf>, 6 pages.

Jain, "Steady State Error: What is it? (Steady-State Gain, Value & Formula)," Electrical4U, Oct. 2020, 1-17.

Liu et al., "Frequency Synchronization in Global Satellite Communications Systems," IEEE Transactions on Communications, Mar. 2003, 51(3):359-365.

Marrero et al., "Architectures and Synchronization Techniques for Distributed Satellite Systems: A Survey," CoRR, Submitted on Mar. 2022, arVix:2203.08698, 39 pages.

networklessons.com [online], "Introduction to Precision Time Protocol (PTP)," available on or before Dec. 14, 2023, via Internet Archive: Wayback Machine URL <https://web.archive.org/web/20231214000358/https://networklessons.com/cisco/ccnp-encor-350-401/introduction-to-precision-time-protocol-ptp>, retrieved on Feb. 29, 2024, URL <https://networklessons.com/cisco/ccnp-encor-350-401/introduction-to-precision-time-protocol-ptp>, 21 pages.

Wikipedia.com [online], "Precision Time Protocol," available on or before Feb. 9, 2023, via Internet Archive: Wayback Machine URL <https://web.archive.org/web/20230209105121/https://en.wikipedia.org/wiki/Precision_Time_Protocol>, retrieved on Feb. 29, 2024, URL <https://en.wikipedia.org/wiki/Precision_Time_Protocol>, 10 pages.

Zhang et al., "A Clock Synchronization Algorithm for the Satellite System Based on MF-TDMA," Journal of Physics: Conference Series, Feb. 2021, 1815(1):1-8.

Idrees et al., "IEEE 1588 for Clock Synchronization in Industrial IoT and Related Applications: A Review on Contributing Technologies, Protocols and Enhancement Methodologies, " IEEE Access, Aug. 2020, 8:155660-155678.

International Search Report and Written Opinion in International Appln. No. PCT/US2024/026584, mailed on Aug. 19, 2024, 14 pages.

Wensi, "Study and Implementation of IEEE 1588 Precise Time Protocol," Thesis for the degree of Programme in Information Technology, Tampere University of Technology, Department of Communication Engineering, Aug. 2013, 87 pages.

* cited by examiner

ENHANCED CLOCK FREQUENCY CONTROL

BACKGROUND

Many communication systems, including satellite communication systems, synchronize their clocks to enable effective communication and provide high throughput. As an example, some networks use the precision time protocol (PTP) to synchronize clocks among devices in a network. In satellite communication systems, various transmitters and receivers can be synchronized to provide high reliability and make effective use of limited spectrum resources.

SUMMARY

A communication system may include multiple components that operate in a coordinated manner based on synchronized clocks. For example, the clocks can be used to set the timing of transmissions and other actions. As another example, the clocks can be used to set reference frequencies used to transmit or receive signals (e.g., reference frequencies used to perform modulation, upconversion, downconversion, demodulation, etc.) in systems that require stable signal frequencies (e.g., multi-frequency time division multiple access (TDMA) systems). To improve timing synchronization and achieve stable frequency and time reference synthesis, the clocks of devices in a communication system can be enhanced with one or more filters to adjust the way updates to the clock are performed. For example, a control feedback loop for a frequency source in a clock can be enhanced with a smoothing filter that adjusts the rate at which a clock frequency is changed. The smoothing filter can apply, for example, a weighted average, running average, an exponential smoothing function, or other function to an output of a feedback loop controller to increase the stability of the clock and clock signal frequency.

In satellite communication systems, a satellite gateway often includes multiple different devices or components, such as a modulator, demodulator, upconverter, downconverter, etc. These components each use a time reference or frequency reference to perform their desired functions, and in many cases each include their own clocks. The clocks of the various devices can be synchronized in the system by being synchronized to a reference clock or a master clock. The master clock can have its time set based on a reliable time reference, such as a Global Positioning System (GPS) receiver, atomic clock, or network protocol (e.g., PTP or Network Time Protocol (NTP)). The master clock periodically provides timing information to the clocks of other devices, which can be referred to as ordinary clocks (e.g., slave or follower clocks).

The various devices in the satellite gateway can communicate over a local network (e.g., a packet-based network of devices in the gateway) and can receive timing information from the master clock through the network. For example, the master clock can provide timing information through the precision time protocol (PTP), and various devices in the gateway can set their own clocks based on the timing information from the master clock. Some devices, including networking devices like routers and switches, have clocks that act as intermediaries for timing information, by receiving timing information from the master clock and to distributing timing information to other devices (e.g., slave clocks). The clocks of these intermediary devices are referred to as boundary clocks.

In some implementations, to perform timing synchronization, the master clock sends time stamped packets over the network to the boundary clocks and ordinary slave clocks. Each boundary clock or ordinary slave clock synchronizes itself using the timestamps from these packets. For example, each boundary clock and ordinary slave clock may determine a time offset between its time and the time indicated in a received timing reference packet. Each boundary clock and ordinary slave clock uses its offset to adjust its own local time and, in many cases, the clock frequency of a local clock signal used to track the passage of time or used to generate reference frequencies for communication functions. The boundary clocks and ordinary slave clocks can use a feedback loop, such as a proportional-integral (PI) control loop, to make clock adjustments based on received packets.

Even with the timing synchronization provided by PTP, traditional synchronization techniques do not always provide the consistency and precision needed for high-performance communication systems. Often, PTP clock implementations use PI control loops, which reduce the steady-state error of the clock time, but may not achieve the desired level of stability. For example, even with synchronization using periodic timing reference packets, boundary clocks and ordinary slave clocks may still experience considerable jitter in the reference input from its master clock resulting in significant variation in ordinary slave clock signal frequency over short time windows. In other words, even though the periodic timing packets may limit drift from the time of the master clock over time (i.e., the master source), random variations can still cause significant fluctuations from one update to the next. This jitter may appear as clock updates of significant magnitude in different directions that contribute to instability of the local clock even as the time is adjusted back toward the time of the master clock. Jitter is a significant challenge for boundary clocks, because variability in the boundary clock is passed on to downstream slave clocks and may affect multiple other devices. Once source of jitter can be, for example, an intermediate boundary clock of inferior quality which sends a master clock signal to downstream ordinary slave clocks.

In general, jitter in the clock signals can cause significant challenges in communication systems by introducing error into frequency synthesis and communication slot timing. For example, many devices in a satellite gateway generate a clock signal having a frequency set using the local clock, and the clock signal is a key input for setting reference frequencies for modulation, upconversion, downconversion, demodulation, etc. Satellite gateways often send timing reference information and frequency reference information to terminals, and unstable references from the gateway can hinder the ability of the terminals able to transmit consistently in the designated frequency spectrum of the communication channel. This can result in signal errors and degraded service. In some cases, significant jitter in the local clocks can impair frequency synthesis to the extent that some portions of the signals fall outside the frequency processing range for radiofrequency devices for transmission or reception. The error and instability in synthesized frequencies can result in degradation of the performance of the communication channel, such as in increase packet loss at the physical layer of the network. In addition, in time division multiple access (TDMA) systems, transmissions are carefully timed to specific time slots and sub-slots to maximize throughput. Excessive variation in clocks can result in error in the start or end of transmissions (e.g., missing alignment with the slot boundaries), which may result in lost data or increased interference.

As discussed further below, clock systems of boundary clocks and ordinary slave clocks can use one or more additional filters to increase stability of a clock. The reduced variability of the clocks and frequencies synthesized based on the clocks can improve the reliability of a communication system and improve performance (e.g., increase throughput, reduce physical layer packet loss, etc.). For example, in the feedback loop for a clock, a smoothing filter can be added to adjust output of the feedback loop controller. When a PI controller is used, the output of the PI controller can be adjusted by a smoothing function, such as a weighted average, running average, or an exponential smoothing function. The smoothing function limits the change in magnitude of clock updates from one update to the next, which can reduce the impact of random noise and transient changes and can increase the stability of the clock. The parameters of the smoothing function can be set to achieve the desired level of stability and other performance characteristics.

The enhanced feedback loop can be used to achieve high levels of frequency stability, such as 5 parts per billion (ppb) or less. For example, for clocks used to generate a 10 MHz frequency, the system can achieve a level of stability in the clock so that the generated frequency varies by no more than 5 ppb (0.05 Hz) from the desired 10 MHz frequency. With enhanced clocks enabling very accurate and stable frequency synthesis, the satellite communication system can provide very accurate modulation and demodulation at the gateway and also have the gateway provide very stable references to terminals.

In one general aspect, a satellite terminal includes: one or more modulators configured to generate modulated output for transmission to a satellite; one or more demodulators configured to demodulate signals received from a satellite; a master clock that is configured to determine a time based on global positioning system (GPS) signals and to generate time reference packets based on the time based on GPS signals; a network device including a clock system, wherein the network device is configured to receive time reference packets generated based on the master clock, synchronize the clock system based on the received time reference packets, and use the clock system to transmit time references to the one or more modulators and the one or more demodulators, wherein the clock system includes a feedback loop configured to synchronize the clock system with a reference clock, the feedback loop including: a feedback loop controller configured to determine a clock frequency adjustment for the clock system based on an offset between the time reference and a time indicated by the clock system; and a smoothing filter configured to alter the clock frequency adjustment determined using the feedback loop controller; wherein the feedback loop is configured to update the clock frequency based on the altered clock frequency adjustment.

Other implementations include corresponding systems, apparatus, and software programs, configured to perform the actions of the methods, encoded on computer storage devices. For example, some implementations include a satellite terminal configured to perform the actions of the methods. A device or system of devices can be so configured by virtue of software, firmware, hardware, or a combination of them installed so that in operation cause the system to perform the actions. One or more software programs can be so configured by virtue of having instructions that, when executed by data processing apparatus, cause the apparatus to perform the actions.

Implementations may include one or more of the following features. For example, in some implementations, the time reference packets generated by the master clock are precision time protocol (PTP) packets.

In some implementations, the smoothing filter applies an exponential smoothing function or a weighted average smoothing function.

In some implementations, the clock system of the network device is used to synchronize operation of the one or more modulators and the one or more demodulators.

In some implementations, the satellite gateway is configured to transmit frequency reference information for satellite terminals that communicate with the satellite gateway, and the frequency reference information is based on output of the clock system of the network device.

In some implementations, the clock system is configured to synchronize the clock system with the master clock to generate a frequency reference signal having a peak variation in output frequency of 5 parts per billion (ppb) or less.

In another general aspect, a system includes: a clock system that tracks time using a clock signal having a clock frequency; an interface to receive a time reference from a reference clock; and a feedback loop configured to synchronize the clock system with the reference clock, the feedback loop including: a feedback loop controller configured to determine a clock frequency adjustment for the clock system based on an offset between the time reference and a time indicated by the clock system; and a smoothing filter configured to alter the clock frequency adjustment determined using the feedback loop controller; wherein the feedback loop is configured to update the clock frequency of the clock system based on the altered clock frequency adjustment.

In some implementations, the time reference includes precision time protocol (PTP) packets.

In some implementations, the smoothing filter applies an exponential smoothing function or a weighted average smoothing function.

In some implementations, the clock system is configured to output packets used to synchronize timing of one or more other devices.

In some implementations, the clock system is configured to provide output packets used to synchronize a receiver of a wireless communication system and a transmitter of the wireless communication system.

In some implementations, the clock frequency is used to determine a frequency reference for transmitting or receiving signals in a satellite communication system.

In some implementations, the feedback loop includes a clamping filter configured to limit a magnitude of updates to the clock frequency of the clock system.

In some implementations, the smoothing filter includes a digitally-implemented filter, the feedback loop being configured to calculate clock frequency adjustments for each of a series of time steps, wherein the smoothing filter calculates each of the clock frequency adjustments a weighted average between (i) a first adjustment value determined for a current time step in the series of time steps and (ii) a second adjustment value determined for a previous time step in the series of time steps that immediately precedes the current time step, wherein the first adjustment value and the second adjustment value are weighted according to a predetermined smoothing factor.

In another general aspect, a method performed by a clock system of a communication system includes: tracking, by the clock system, time and generating a clock signal having a clock frequency; receiving, by the clock system, a packet including a time reference from a master clock; determining, by the clock system, an offset between the time reference and a time indicated by the clock system; using, by the clock system, a feedback loop controller to determine a clock frequency adjustment for the clock system based on the offset; applying, by the clock system, a smoothing filter to alter the clock frequency adjustment determined using the feedback loop controller; and updating, by the clock system, the clock system using the altered clock frequency adjustment.

In some implementations, determining the offset includes applying a delay filter configured to limit the determined offset to within a predetermined range.

In some implementations, the method additionally includes, after updating the clock frequency according to the altered clock frequency adjustment, performing at least one of (i) using the updated clock frequency to generate a frequency reference for a modulator or demodulator of the communication system or (ii) sending a time reference packet indicating a time based on the updated clock frequency to a modulator or demodulator of the communication system.

In some implementations, the feedback loop controller is a proportional-integral (PI) feedback loop controller.

In some implementations, the clock system is configured to use a time determined using an updated clock frequency to send packets to synchronize timing of one or more other devices.

In some implementations, the communication system includes a satellite communication system, and wherein the clock system is included in a satellite gateway and is used to synchronize a transmit chain or receive chain with a master clock of the satellite gateway.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
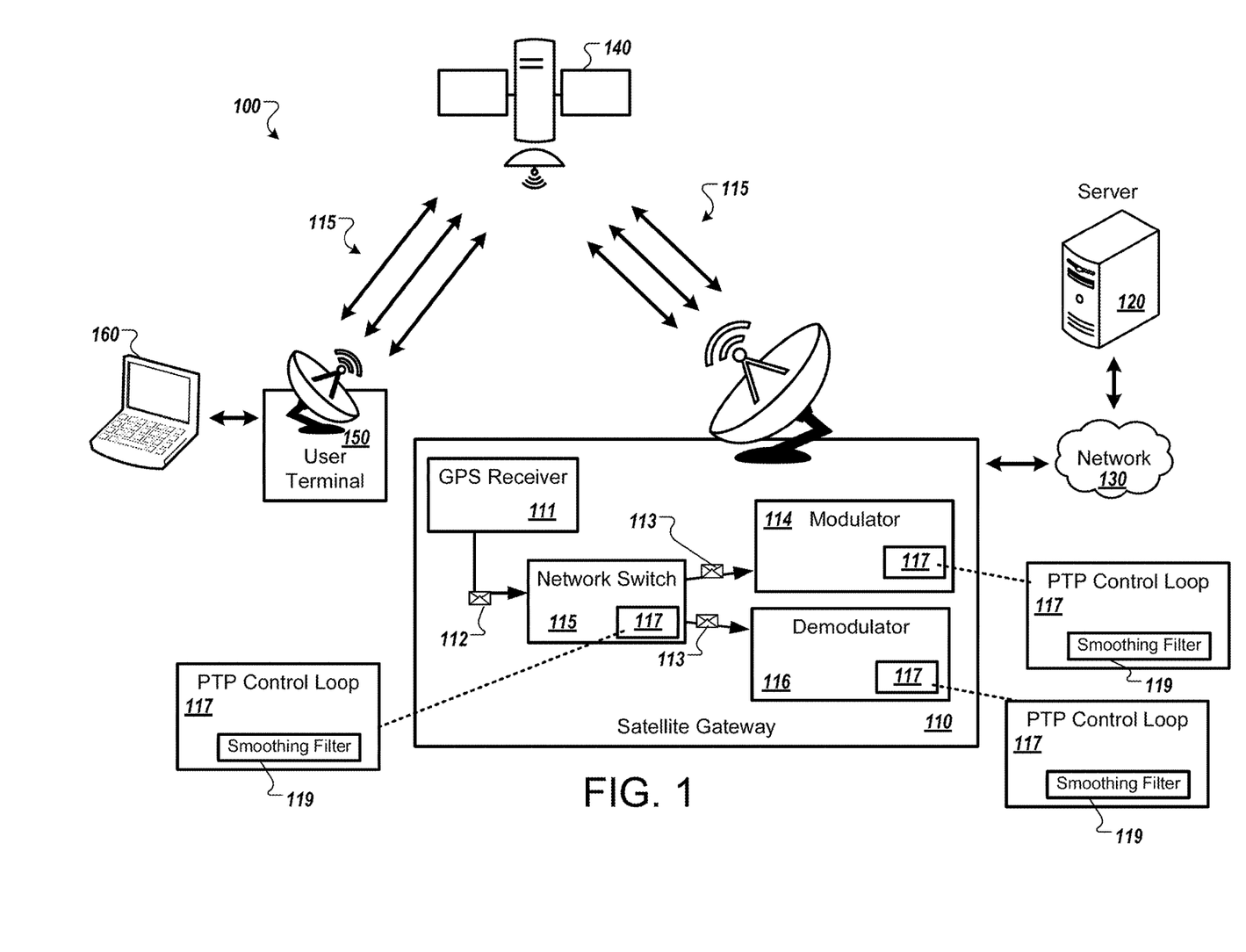
FIG. 1 is a diagram that illustrates an example of a satellite communication system that provides enhanced clock synchronization and clock frequency control.

FIG. 1 illustrates an example of a satellite communication system 100 that provides enhanced clock synchronization and clock frequency control. The system 100 includes a satellite gateway 110, a satellite 140, and a user terminal 150 that provide a satellite communication link with bi-directional communication. The satellite link enables a user device 160 communicating with the terminal 150 to exchange data with a server 120 or other device. The server 120 communicates with the satellite gateway 110 over a network 130, such as the Internet.

The satellite gateway 110 includes one or more modulators 114, one or more demodulators 116, and other components. Each of these components can have its own clock, to track time and provide a clock frequency for generating reference frequency signals used to perform their respective signal processing operations. The satellite gateway 110 can use the precision time protocol (PTP) to synchronize the clocks of different devices in the satellite gateway 110 and to maintain clock signal frequencies with high accuracy.

The components in the satellite gateway 110 are connected in a local packet-based network. To provide PTP synchronization, the network can have a master clock, boundary clocks, and ordinary slave clocks. For example, a GPS receiver 111 can determine a time based on GPS signals and can serve as the master clock for the local network of the satellite gateway 110. The GPS receiver 111 can provide PTP packets 112 to other devices in the satellite gateway 110 that have boundary clocks or ordinary slave clocks. For example, the satellite gateway 110 can include networking components such as a network switch 115 that serves as a boundary clock that synchronizes based on received PTP packets 112 from the master clock (e.g., GPS receiver 111), and then sends its own PTP packets 113 to synchronize various ordinary slave clocks. For example, the modulator 114 and demodulator 116 can each include ordinary slave clocks, and can receive PTP packets 113 from the network switch 115 acting as a boundary clock. The ordinary slave clocks within modulator 114 and demodulator 116 can then use the received PTP packets 113 for clock synchronization.

In the satellite gateway 110, the accuracy and precision of the clocks and reference frequencies often affect the communication performance and throughput of the system. To synchronize clocks in the satellite gateway 110, various components of the satellite gateway 110 that have clocks can also have a PTP control loop 117 to perform clock synchronization based on received PTP packets 112, 113. For example, the network switch 115, the modulator 114, and the demodulator 116 can each have a PTP control loop 117 to synchronize their respective clocks (e.g., to set a correct and uniform time) and their respective clock frequencies (e.g., the clock signal frequencies used to derive reference frequencies and otherwise operate the devices).

To synchronize the timing throughout the satellite gateway 110, the master clock sends time-stamped PTP packets 112 over the network to the boundary clocks of network switches 115, which send PTP packets 113 to the ordinary slave clocks in the modulators 114 and demodulators 116. These clocks can each have their own clock signal generator that maintains the timing signal used by the modulator 114 or demodulator 116. Each boundary clock or ordinary slave clock synchronizes itself with the master clock using the timestamps from these PTP packets 112, 113. For example, each boundary clock and ordinary slave clock can determine a time offset between its time and the time indicated in a received timing reference PTP packet 112, 113. Each boundary clock and ordinary slave clock uses its offset to adjust its own local time and, in many cases, the clock frequency of a clock signal generator used to track the passage of time or used to generate reference frequencies for communication functions.

The boundary clocks and ordinary slave clocks can use a PTP control loop 117 to make clock adjustments based on the received PTP packets 112, 113. This PTP control loop can contain one or more filters to process the received PTP packets 112, 113. Often, a single PTP packet 112 is not used for synchronization, but rather, information from a series of PTP packets 112 are averaged over time. This stabilizes the synchronization of the clocks and limits the effect of transient delays or noise on the clocks. Different combinations of filters provide different synchronization advantages based on the application. Example filters that can be utilized in a PTP control loop include delay filers and PI filters.

The PTP control loop 117 includes an additional smoothing filter 119. The smoothing filter 119 adjusts the rate at which a clock frequency is changed. The smoothing filter 119 can apply, for example, a weighted average, running average, an exponential smoothing function, or other function to an output of a feedback loop controller to increase the stability of the clock and clock signal frequency. The smoothing filter 119 can accompany a delay or PI filter and is designed to further reduce the jitter in the received signals. The addition of a smoothing filter 119 can achieve a higher frequency stability required for some communication applications.

As illustrated, PTP packets 112 are passed from the GPS receiver 111 in the satellite gateway 110 to network switch 115 which serves as a boundary clock that provides PTP packets 113 to the modulators 114 and demodulators 116. In many cases, devices such as the modulators 114 and demodulators 116 need high precision and high accuracy in the timing and frequency references that they use, in order to be able to synthesize high-frequency signals accurately and to be able to send and receive signals within small margins of error. To achieve the performance needed at the physical layer, these devices may need a high accuracy in their frequency references, such as less than 20 ppb, less than 10 ppb, less than 5 ppb, and so on. Conventional PTP processing does not achieve these standards in many cases. For example, in systems with a boundary clock, such as represented by network switch 115, the boundary clock may introduce a significant amount of noise or jitter in the timing signals. As a result, the references that ordinary slave clocks receive or generate based on the PTP packets from boundary clocks may fail to achieve the desired standard of frequency accuracy and stability. By including the smoothing filter 119 in the PTP control loop 117, the clocks of the modulators 114 and demodulators 116 can be made much more stable and resistant of potential jitter added by the boundary clock that sends the packets 113. In some implementations, the use of the enhanced PTP control loop with the smoothing filter 119 can enable high accuracy, low-error time synchronization in the ordinary slave clocks (e.g., less than 5 ppb), even when the boundary clock provides PTP packets 113 with a level of jitter that would normally not permit this level of accuracy. In some cases, the enhanced PTP control loop 117 with the smoothing filter can also be used in boundary clocks, such as in the network switch 115.

Figure 2:
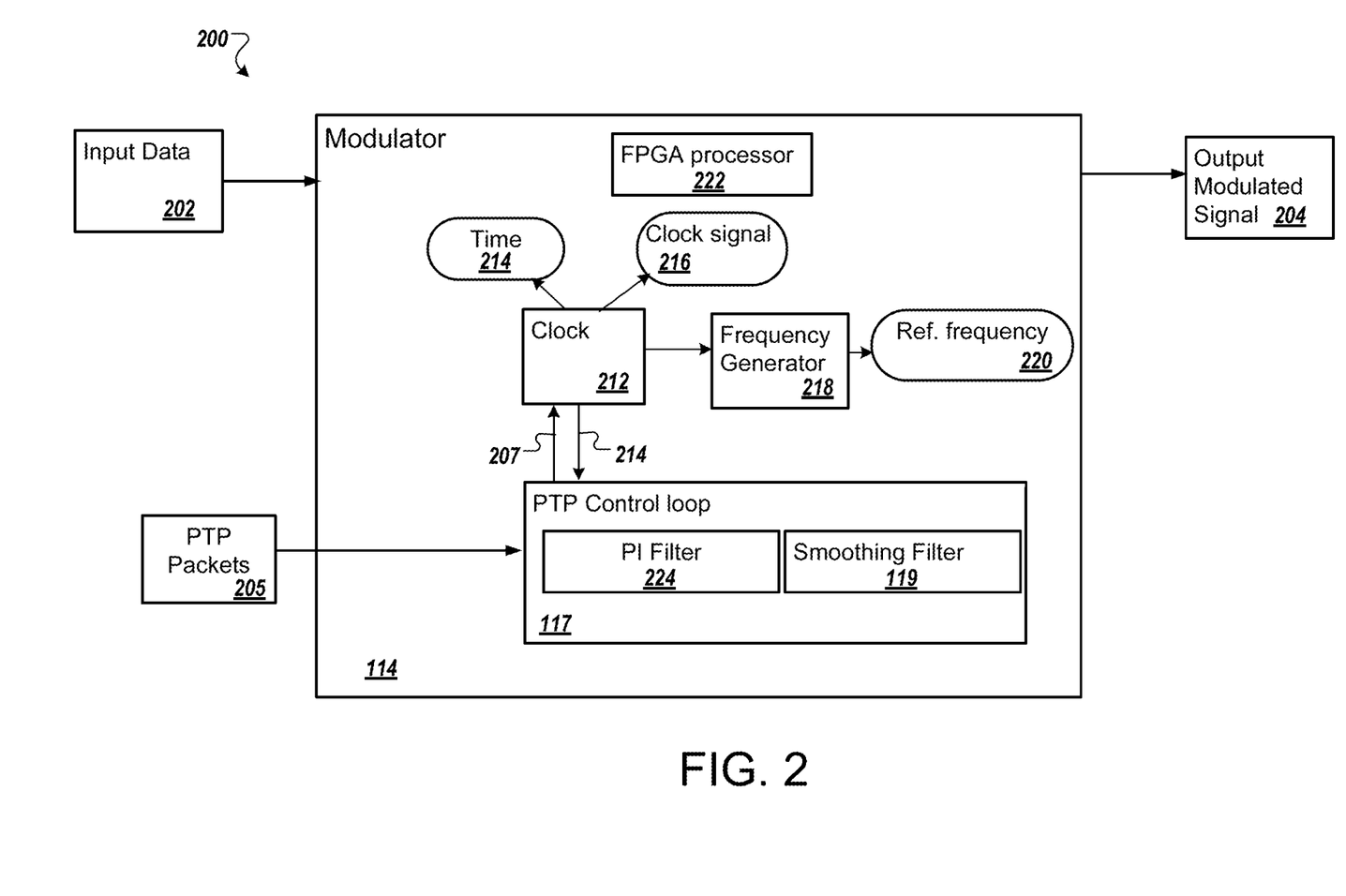
FIG. 2 is a block diagram that illustrates an example signal modulator.

FIG. 2 is a block diagram 200 that illustrates an example signal modulator 114 that uses an enhanced PTP control loop 117 that includes a smoothing filter 119. The modulator 114 is configured to receive input data 202 to be transmitted, and the modulator 114 provides output of a modulated signal 204 that has the input data 202 modulated onto a carrier. The modulator 114 includes one or more processors 222, such as field-programmable gate array (FPGA) processors to perform the operations of the modulator 114.

The signal modulator 114 includes a clock 212, which provides an indication of the current time 214 and also provides a clock signal 216. The clock signal 216 can be used to operate the clock 212 and perform other functions. The outputs of the clock 212 are important in the gateway 110 to track timing precisely so that signals that are generated and transmitted align with timing of slot boundaries in a TDMA frame and other sub-slot boundaries (e.g., as in a terminal or demodulator), such as periods for control signals, data bursts, and so on. In addition, the clock signal 216 is used to generate a frequency reference 220 that is used to perform modulation. For example, the clock signal 216 can be provided to a frequency generator 218 that uses the clock signal 216 to generate the reference frequency 220, which can be a carrier frequency or fraction of the carrier frequency used by the modulator 114.

The clock 212 is synchronized using a PTP control loop 117. The modulator 114 receives a stream of PTP packets 205 over time, such as from a boundary clock such as the network switch 115. The PTP control loop 117 determines the error between the time indications in the PTP packets 205 and the time 214 of the clock 212 and makes gradual adjustments to synchronize the clock 212. For example, if the clock 212 is running behind a time reference received in a PTP packet, the clock signal can be incrementally increased to bring the clock's time tracking into synchronization. Similarly, if the clock 212 is running ahead of a time reference received in a PTP packet, the clock signal can be incrementally decreased to bring the clock's time tracking into synchronization.

The PTP control loop 117 includes a PI filter 224 and smoothing filter 119. The PI filter serves as a feedback loop controller for the feedback loop. The smoothing filter 119 can be implemented as a low-pass filter that filters out or reduces high-frequency noise in the level of error determined in the control loop 117. In other words, the smoothing filter 119 can smooth abrupt changes in the level of timing error that result from jitter in the timing of the PTP packets, which may be a result of limitations of the network switch 115 (e.g., a poor quality clock), variable network delays for the local packet-switched network in the gateway 110, or other factors.

The PTP packets 205 are time-stamped packets that are sent in an ongoing manner from the boundary clock or master clock. The PTP control loop 117 uses the error between the time 214 from the clock 212 and the time indicated by the received PTP packets 205 to determine a synchronization signal 207 indicating how the clock 212 should be adjusted to achieve synchronization. As discussed further below, the timing information can be averaged over time and used to form a synchronization signal 207. This synchronization signal 207 is formed by passing the timing error information through the PI filter 224 and the smoothing filter 119.

While a modulator 114 is shown in FIG. 2, a demodulator 116 or other ordinary slave clock can have similar components, such as the clock 212, frequency generator 218, and so on.

Figure 3:
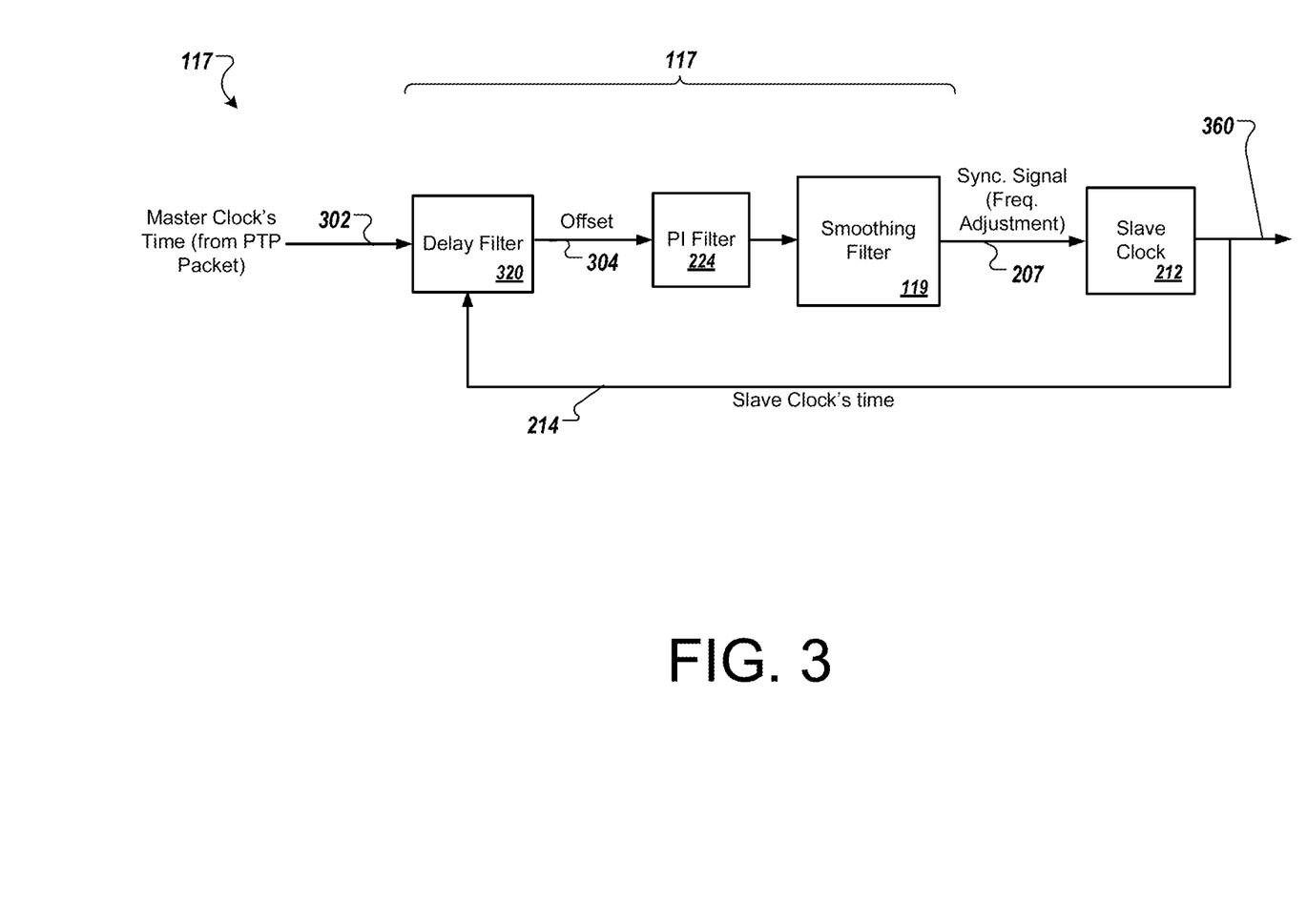
FIG. 3 is a block diagram that illustrates an example PTP control loop.

FIG. 3 is a block diagram that illustrates an example PTP control loop 117 that includes the smoothing filter 119. The PTP control loop 117 includes a delay filter 320, the PI filter 224, and the smoothing filter 119.

The PTP control loop 117 receives input of a time 302 indicated by a master clock, as determined from a received PTP packet. The delay filter 320 receives the master clock's time 302 as well as the time 214 from the slave clock 212. The delay filter 320 calculates an offset 304 of the slave clock's time 214 with respect to the master clock's time 302.

The offset 304 is then provided to the PI filter 330, which has both a proportional component and integral component. The proportional component within the PI filter 330 multiplies the PTP signal by a preset constant. In some cases, a higher constant results in a more vigorous signal correction. This proportional component is usually more suited to provide more immediate changes to large errors in the master clock signal 310. The integral component within the PI filter 330 maintains a running sum of the offset and multiples this total by another preset constant. This integral component is usually more suited to provide changes to errors that persist over time in the master clock signal 310.

The output of the PI filter 224 is then passed to an in-line smoothing filter 119. This smoothing filter 119 operates by applying a smoothing function or low-pass function that can have one or more preset constants. In some cases, this smoothing function is an exponential smoothing function that represents a moving weighted average of offset signals. This moving weighted average can calculate values using the previously calculated value in combination with the current sample value. An example of this function is provided below:

$$\text{new\_smooth} = \text{old\_smooth} * (1 - k) + \text{new\_sample} * k$$

where k is a constant that can be set between a range of values. In some cases, this range of values can be 0.001 to 0.999. A low value of k can provide more smoothing and a slower response, while a higher value of k provides less smoothing and a faster response.

This averaging technique is beneficial because no memory is needed to store a series of values from prior iterations, and computational demands are low. Other techniques and functions can be used to implement the smoothing filter 119. For example, the system could save the most recent N samples and average over the most recent N samples at each iteration. The average may be a weighted average, so that the most recent samples are weighted more highly than the oldest samples in the window of N samples. In some implementations, the weights can be part of an exponential function series.

Although the PI filter 224 enhances the steady-state accuracy of the clock 212, the operation of PI filters, in general, can introduce short-term instability. The smoothing filter 119 limits the change in magnitude of clock updates from one update to the next, which can reduce the impact of random noise and transient changes and can increase the stability of the clock. With the smoothing filter 119, adjustments to the clock 212 may take longer to reach steady-state accuracy, but the risk of short-term inaccuracies is greatly reduced, allowing a very stable clock (e.g., with error of less than 5 ppb), even when a boundary clock may introduce jitter in the PTP messages. In a satellite communication system, preventing even temporary inaccuracies has a high benefit, to ensure that generated frequencies are accurate and can be appropriately received by terminals, and so clock instability is not propagated to terminals. The parameters of the smoothing filter 119 can be set to achieve the desired level of stability and other performance characteristics.

The output of the smoothing filter 119 is a synchronization signal 207 that indicates the level of frequency adjustment to be made at the slave clock 212. By adjusting the clock frequency used by the clock 212, the time of the clock 212 can be adjusted and the ongoing tracking of time by the clock 212 is improved. The updated time 214 of the clock is provided to the delay filter 320 so that the next update for the clock 212 can be determined.

In some implementations, an additional clamping filter is included in the PTP control loop 117, between the smoothing filter 119 and the slave clock 212. The clamping filter can clamp the output of the smoothing filter 119 to further reduce noise in the synchronization signal 207. Even with the smoothing function applied by the smoothing filter 119, there can still be some noise in the output. Variation from sample to sample may be high but random, and the variation could be consistently driven in one direction. As a result, a clamping filter can correct for biases (e.g., single-direction error) in the PTP signals received, to further provide a clock that is more stable than the incoming PTP packets would allow with only a PI filter. The clamping filter can clamp the output of the smoothing filter to limit the update of the slave clock to a value in a predetermined range. For example, the clamping filter can be used to limit a maximum and/or minimum value of the synchronization signal 207 that is applied to slave clock 212. The maximum and/or minimum values used in the clamping filter can be set based on characteristics of the quality of the clock and its drift characteristics.

Figure 4:
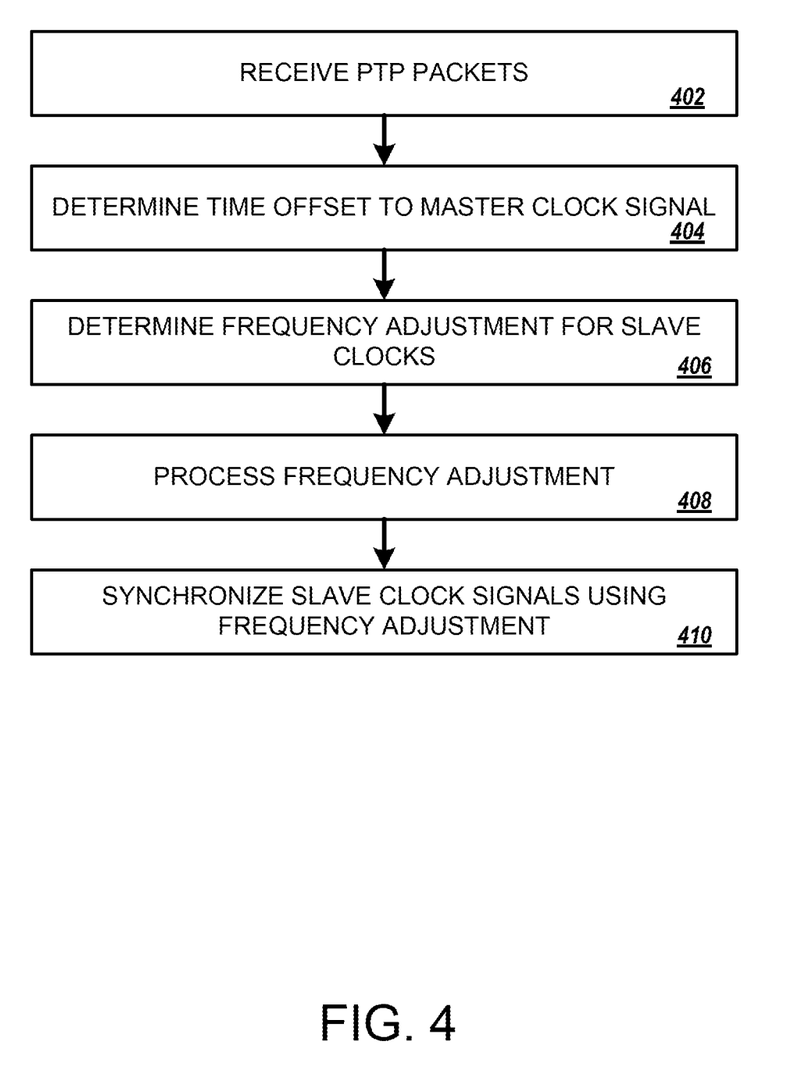
FIG. 4 is a flow diagram that illustrates the process of improving the synchronization of one or more clocks in a PTP system.

FIG. 4 is a flow diagram that illustrates the process 400 of improving the synchronization of one or more clocks in a PTP system. This process includes receiving a plurality of PTP packets 302 in a step 402, determining a time offset to a master clock signal 304 in a step 404, determining a frequency adjustment 207 for one or more slave clocks 212 in a step 406, processing the frequency adjustment 207 in a step 408, and synchronizing the slave clock signals 214 using the frequency adjustment 207 in a step 410.

As discussed above, a plurality of PTP packets 302 may be passed by the master clock through the system for the purposes of synchronization. The downstream communication devices receive these time-stamped PTP packets 302 in the step 402 which are used to calculate the time or frequency offset 304 to the master clock signal.

A time offset to the master clock signal 304 is determined in the step 404 from the reference time and the time indicated by the master clock's PTP signal 302. The reference time can be maintained in a device's internal clock 212, which can be a boundary or ordinary slave clock. A frequency adjustment 207 for the device's internal clocks can then be determined in the step 406.

The frequency adjustment 207 can then be processed in the step 408 to remove errors in the PTP signal and reduce jitter. This processing can include a series of filters, to include a PI filter and low-pass smoothing filter. These filters can have mathematical functions with one or more constants that can be specified by the user to achieve a certain goal, for example, a fast response time at the expense of less smoothing. Processing of the PTP signal can be performed within the device, for example, by one or more FPGA processors. Alternatively, or in addition, the processing of the PTP signal can also be performed by various software programs or computer program modules. Once the frequency adjustment 207 is determined, the adjustment 207 is used to synchronize the device's slave clock signals 214 in the step 410.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented, in part, as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatuses, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

What is claimed is:

1. A satellite gateway comprising:
   one or more modulators configured to generate modulated output for transmission to a satellite;
   one or more demodulators configured to demodulate signals received from the satellite;
   a master clock that is configured to determine a time based on global positioning system (GPS) signals and to generate time reference packets based on the time based on GPS signals;
   a network device comprising a clock system, wherein the network device is configured to receive time reference packets generated based on the master clock, synchronize the clock system based on the received time reference packets, and use the clock system to transmit time references to the one or more modulators and the one or more demodulators, wherein the clock system comprises a feedback loop configured to synchronize the clock system with a reference clock, the feedback loop comprising:
   a feedback loop controller configured to determine a clock frequency adjustment for the clock system based on an offset between the time reference and a time indicated by the clock system; and
   a smoothing filter configured to alter the clock frequency adjustment determined using the feedback loop controller;
   wherein the feedback loop is configured to update a clock frequency based on the altered clock frequency adjustment.

2. The satellite gateway of claim 1, wherein the time reference packets generated by the master clock are precision time protocol (PTP) packets.

3. The satellite gateway of claim 1, wherein the smoothing filter applies an exponential smoothing function or a weighted average smoothing function.

4. The satellite gateway of claim 1, wherein the clock system of the network device is used to synchronize operation of the one or more modulators and the one or more demodulators.

5. The satellite gateway of claim 1, wherein the satellite gateway is configured to transmit frequency reference information for satellite terminals that communicate with the satellite gateway, and the frequency reference information is based on output of the clock system of the network device.

6. The satellite gateway of claim 1, wherein the clock system is configured to synchronize the clock system with the master clock to generate a frequency reference signal having a peak variation in output frequency of 5 parts per billion (ppb) or less.

7. A system comprising:
   a clock system that tracks time using a clock signal having a clock frequency;
   an interface to receive a time reference from a reference clock; and
   a feedback loop configured to synchronize the clock system with the reference clock, the feedback loop comprising:
   a feedback loop controller configured to determine a clock frequency adjustment for the clock system based on an offset between the time reference and a time indicated by the clock system; and a smoothing filter configured to alter the clock frequency adjustment determined using the feedback loop controller;
wherein the feedback loop is configured to update the clock frequency of the clock system based on the altered clock frequency adjustment.

8. The system of claim 7, wherein the time reference comprises precision time protocol (PTP) packets.

9. The system of claim 7, wherein the smoothing filter applies an exponential smoothing function or a weighted average smoothing function.

10. The system of claim 7, wherein the clock system is configured to output packets used to synchronize timing of one or more other devices.

11. The system of claim 10, wherein the clock system is configured to provide output packets used to synchronize a receiver of a wireless communication system and a transmitter of the wireless communication system.

12. The system of claim 10, wherein the clock frequency is used to determine a frequency reference for transmitting or receiving signals in a satellite communication system.

13. The system of claim 7, wherein the feedback loop includes a clamping filter configured to limit a magnitude of updates to the clock frequency of the clock system.

14. The system of claim 7, wherein the smoothing filter comprises a digitally-implemented filter, the feedback loop being configured to calculate clock frequency adjustments for each of a series of time steps, wherein the smoothing filter calculates each of the clock frequency adjustments a weighted average between (i) a first adjustment value determined for a current time step in the series of time steps and (ii) a second adjustment value determined for a previous time step in the series of time steps that immediately precedes the current time step, wherein the first adjustment value and the second adjustment value are weighted according to a predetermined smoothing factor.

15. A method performed by a clock system of a communication system, the method comprising:

tracking, by the clock system, time and generating a clock signal having a clock frequency;
receiving, by the clock system, a packet comprising a time reference from a master clock;
determining, by the clock system, an offset between the time reference and a time indicated by the clock system;
using, by the clock system, a feedback loop controller to determine a clock frequency adjustment for the clock system based on the offset;
applying, by the clock system, a smoothing filter to alter the clock frequency adjustment determined using the feedback loop controller; and
updating, by the clock system, the clock system using the altered clock frequency adjustment.

16. The method of claim 15, wherein determining the offset includes applying a delay filter configured to limit the determined offset to within a predetermined range.

17. The method of claim 15, further comprising, after updating the clock frequency according to the altered clock frequency adjustment, performing at least one of (i) using the updated clock frequency to generate a frequency reference for a modulator or a demodulator of the communication system or (ii) sending a time reference packet indicating a time based on the updated clock frequency to the modulator or the demodulator of the communication system.

18. The method of claim 15, wherein the feedback loop controller is a proportional-integral (PI) feedback loop controller.

19. The method of claim 15, wherein the clock system is configured to use a time determined using an updated clock frequency to send packets to synchronize timing of one or more other devices.

20. The method of claim 15, wherein the communication system comprises a satellite communication system, and wherein the clock system is included in a satellite gateway and is used to synchronize a transmit chain or receive chain with the master clock of the satellite gateway.

* * * * *